United States Patent
Loehndorf

[19]

[11] Patent Number: 6,085,691
[45] Date of Patent: Jul. 11, 2000

[54] FORMED TREAT SUPPORT

[75] Inventor: Mark Loehndorf, Chilton, Wis.

[73] Assignee: Kaytee Products, Inc., Chilton, Wis.

[21] Appl. No.: 09/133,250

[22] Filed: Aug. 13, 1998

[51] Int. Cl.[7] .................................................. A01K 39/01
[52] U.S. Cl. ................................... 119/51.01; 119/51.03; 119/578
[58] Field of Search .............................. 119/51.01, 51.03, 119/706, 708, 711, 57.8

[56] References Cited

U.S. PATENT DOCUMENTS

| | | |
|---|---|---|
| 281,993 | 7/1883 | Goldstein . |
| D. 353,535 | 12/1994 | Grittman et al. . |
| 1,810,836 | 6/1931 | Laubenstein . |
| 2,306,312 | 12/1942 | Hyde . |
| 2,783,155 | 2/1957 | Haug . |
| 3,175,536 | 3/1965 | Hilaire . |
| 3,200,790 | 8/1965 | Anderson . |
| 3,595,209 | 7/1971 | Parker ..................................... 119/706 |
| 4,135,692 | 1/1979 | Ferguson . |
| 4,215,652 | 8/1980 | Kerscher ................................. 119/57.8 |
| 4,602,757 | 7/1986 | Signorelli ............................ 248/223.41 |
| 4,611,556 | 9/1986 | Frank ....................................... 119/706 |
| 4,667,913 | 5/1987 | Peelle et al. . |
| 4,996,947 | 3/1991 | Petrides ................................... 119/57.9 |
| 5,033,708 | 7/1991 | Brue et al. . |
| 5,323,995 | 6/1994 | Grittman et al. . |
| 5,452,682 | 9/1995 | Bescherer et al. ...................... 119/57.8 |
| 5,664,754 | 9/1997 | Gaenslen . |
| 5,875,735 | 3/1999 | Bradley et al. .......................... 119/706 |

*Primary Examiner*—Peter M. Poon
*Assistant Examiner*—Yvonne R. Abbott
*Attorney, Agent, or Firm*—Brian G. Gilpin; Godfrey & Kahn, S.C.

[57] ABSTRACT

A support structure to which a conglomeration of small animal food can be affixed and around which a conglomeration can be formed includes a shaft having a top and bottom plate at opposite ends thereof. The top plate includes a hanging clip capable of securing the support to a small animal cage or other support structure and the bottom plate may have a securing clip capable of better securing the support to the cage. In order to improve the ability of the support structure to retain the conglomeration thereon when an animal picks at it, a plurality of protuberances are disposed along the length of the shaft. Small animal food is disposed about the shaft between the top and bottom plates and is held together and to the shaft and plates by a sticky material such as honey, dextrose, or other edible substance.

14 Claims, 3 Drawing Sheets

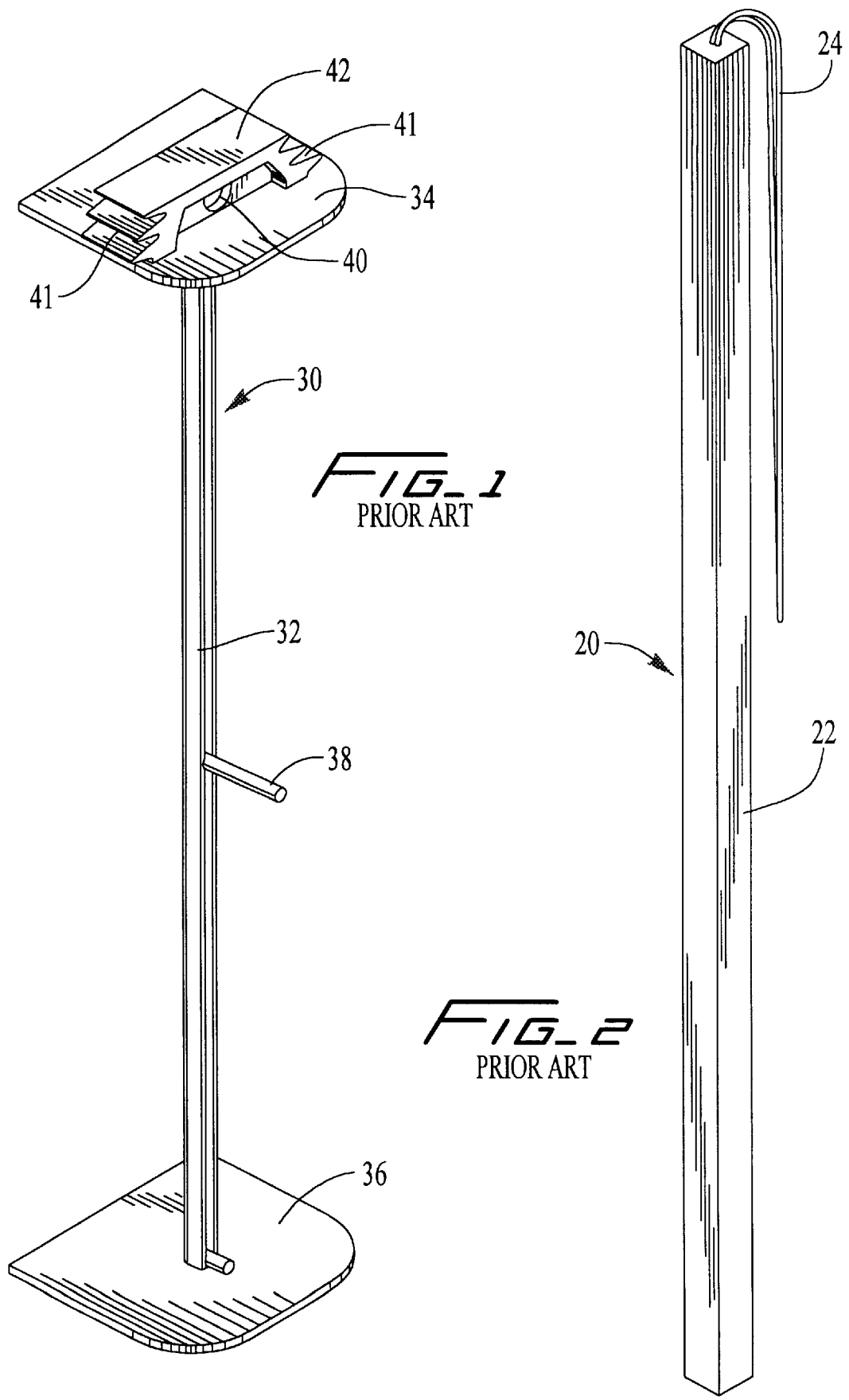

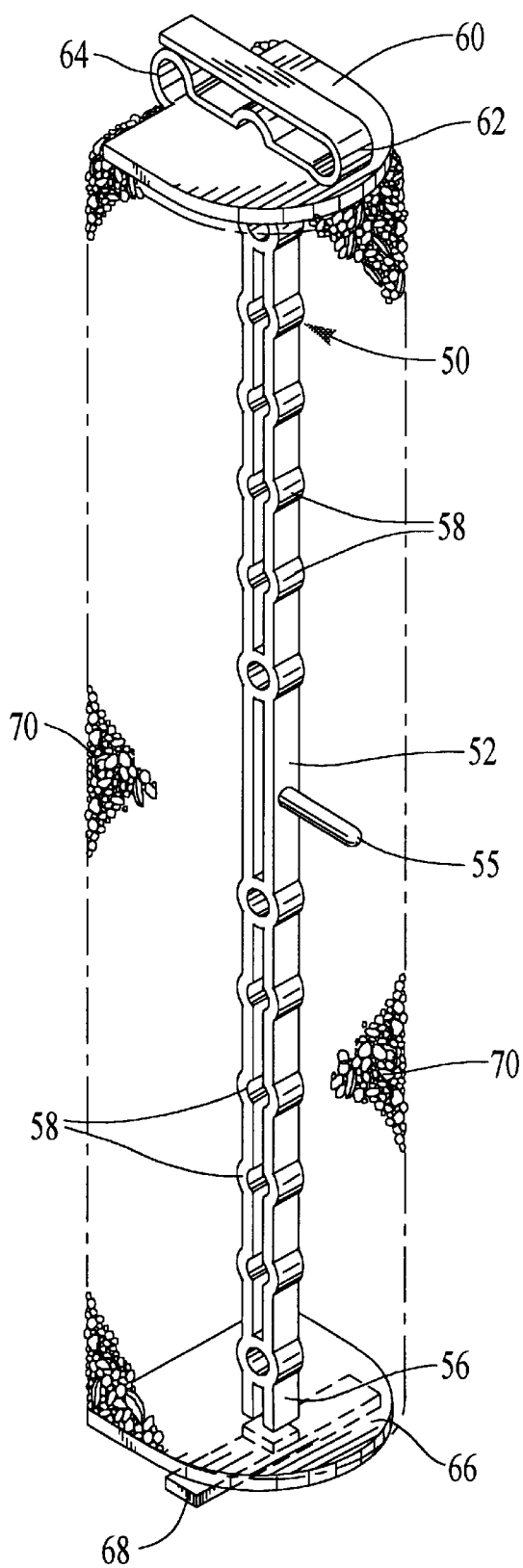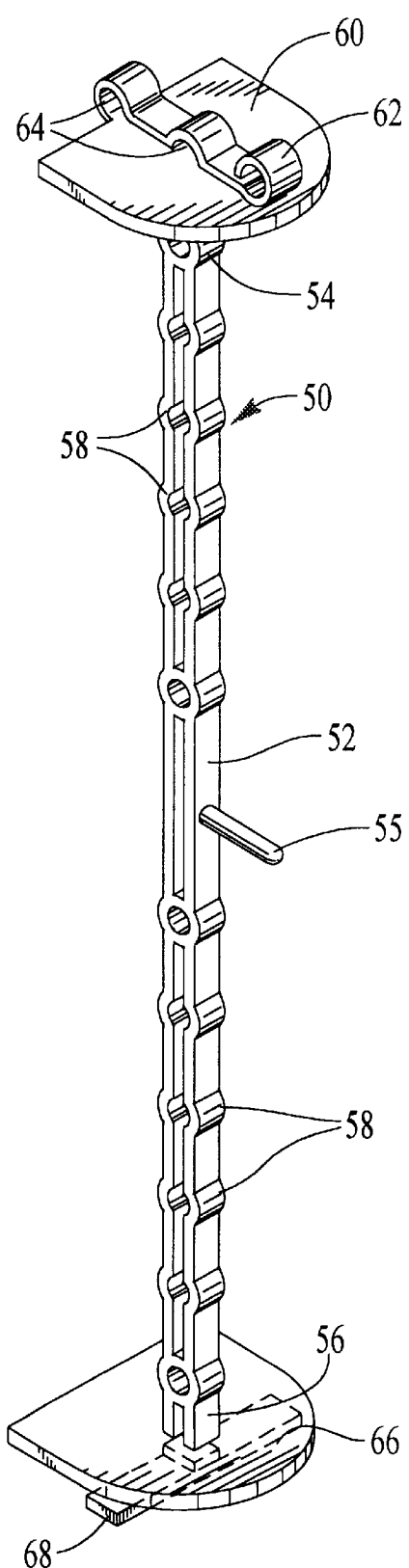

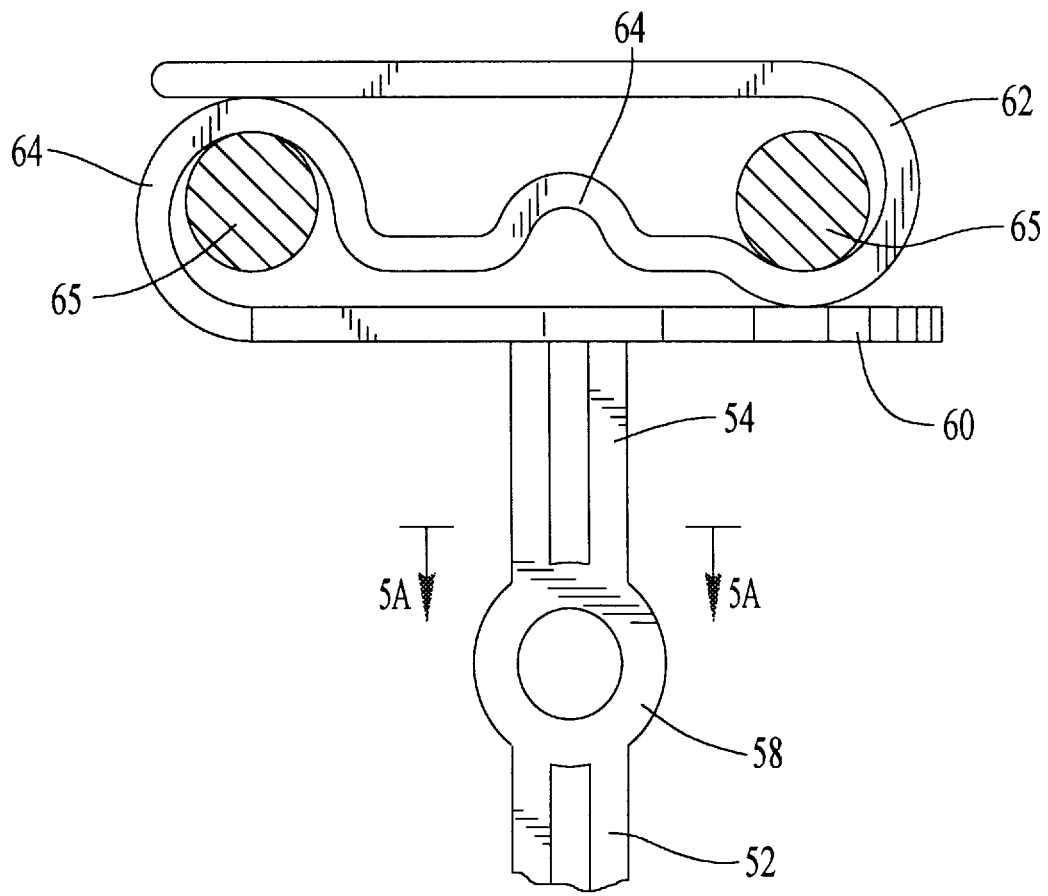
FIG_5
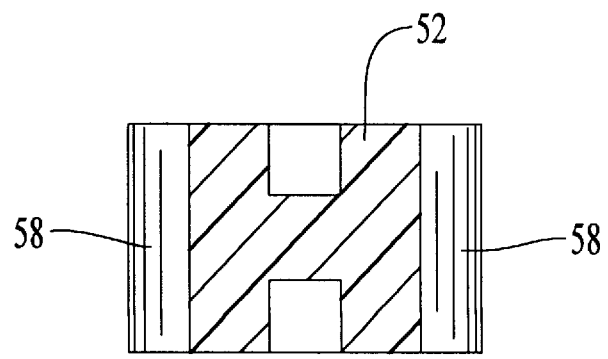
FIG_5A

FORMED TREAT SUPPORT

BACKGROUND OF THE INVENTION

This invention relates generally to treat feeders for small animals and birds, and in particular to an improved support structure to which a conglomeration of seed, treat, or other small animal food can be securely affixed and which can be easily fastened to a small animal cage or other supporting device.

Pet birds such as cockatiels and parakeets require a steady diet including a variety of birdseeds. Other small animals such as gerbils, mice, rabbits, and guinea pigs also require a diet including a variety of foods.

One method of providing such a variety is through a formed conglomeration including a variety of seeds, treat, or other food. For example, formed birdseed food products typically include a combination of seeds such as white millet, sunflower, red millet, canary grass seed, and sunflower seeds held together by an edible sticky material such as honey or dextrose. The formed conglomeration is then placed or hung inside the animal cage so that the animal can eat as desired. Conventional hangers for formed seed products are shown in FIGS. 1 and 2 and the use of a support for a formed seed food product displaced on or around a hanger is disclosed in U.S. Pat. Nos. 5,033,708, 5,323,995, and D353,535, all assigned to the assignee of the present invention, the disclosures of which are incorporated herein by reference. The present invention may be used in a variety of applications involving conglomerations including food other than or in addition to seed. As such, references herein to birdseed or seed are merely illustrative of one possible use of the present invention.

The prior art hanger shown in FIG. 2 (identified generally as 20) includes a generally square-shaped wood shaft 22 with a loop of wire 24 extending therefrom. The wood shaft 22 may be bass or other lightweight wood and may have a variety of shapes. A conglomeration of seed is formed around and to the wood shaft 22 using sticky material included with the seed as an adhesive. The wire loop 24 can be hooked over or twisted around the frame of a cage to hang the formed seed product within the cage for easy access by the animal.

The prior art hanger shown in FIG. 1 (identified generally as 30) is formed from plastic and is somewhat of an improvement over the hanger 20 in FIG. 2. In addition to a shaft portion 32, the hanger 30 includes top 34 and bottom 36 plates in an attempt to prevent the conglomeration of seed from sliding off the shaft 32 when the animal picks at the conglomeration of seed. The hanger 32 further includes a post 38 extending substantially perpendicularly from the shaft 32. The post 38 helps to support the shaft 32 and prevent it from bending as the treat conglomeration is being formed around the shaft 32. The hanger 32 may be suspended from a cage by tying a string or wire through aperture 40 in hanging head 42 on top of the top plate 34. The grooved portions 41 of the hanging head 42 may also be snapped between the bars of cages having the correct bar spacing.

While somewhat effective, there is at least one major drawback to using conventional hangers for formed seed or food products such as the ones shown in FIGS. 1 and 2. The problem is that the conglomeration does not adhere to the hangers very well and when the animal picks off a certain amount of food, large chunks of the conglomeration and even the entire conglomeration itself may slide off the hanger and fall to the bottom of the cage. An additional drawback to the prior art hangers shown in FIGS. 1 and 2 is that no means for securing the hanger at its bottom is provided and the product may swing or bang around the cage as the animal picks at the food. This banging may result in additional pieces of food falling from the hanger and being wasted. Further, the prior art hanger shown in FIG. 1 requires the use of an additional piece of wire to affix the hanger to the cage. While the hanger in FIG. 1 includes top 34 and bottom 36 plates in an effort to prevent the conglomeration from falling off the shaft 32, the employment of such features alone has not been found to be entirely effective.

Accordingly, a need exists for a formed seed or treat hanger that is capable of effectively retaining the conglomeration on the hanger when the animal picks at the seeds, is easily installed in a cage, does not require the use of additional parts to effectuate the installation, is capable of securing both the top and the bottom of the hanger in position, and is cost-effective. The present invention relates to an improved hanger which is capable of effectively retaining the seed or other food on the hanger and solves the problems raised or not solved by existing hangers.

SUMMARY OF THE INVENTION

It is therefore an object of the present invention to provide a hanger for formed seed or treat products to which the conglomeration may be easily adhered and that is capable of retaining the conglomeration on the hanger when the animal picks at the food. It is another object of the present invention to provide a hanger for formed seed or treat products that is easily installed and effectively secured in most cages without the use of additional hanging materials. It is an additional object of the present invention to provide a hanger for formed seed or treat products that is cost-effective.

The hanger for formed seed or treat products of the present invention provides the above identified and many additional objects by providing a hanger for formed foods that retains the conglomeration on the hanger when the food is picked at by the animal, that is easily and securely installed in most cages without the use of additional hanging materials, and is cost effective. As described in more detail below and shown in the accompanying drawings, the hanger for formed seed or treat products of the present invention includes a shaft with multiple gibbous protuberances thereon and a post extending therefrom. The shaft has an H-shaped cross-section and may include a post extending therefrom that helps support the shaft and prevent it from bending as the food is being formed on and around the shaft. The hanger includes a top and a bottom plate on opposite ends of the shaft. The top plate has a hanging clip included therewith which is clipped to the bars of the cage to suspend the hanger. The bottom plate has a securing clip included therewith which can also be secured to bars of the cage to more fixedly secure the hanger within the cage and prevent swinging of the hanger as the animal picks at the food. Formed around the shaft and between the plates is a conglomeration of seed, treat, or other food stuck together using an edible sticky material such as honey or dextrose.

The protuberances on the shaft in combination with the H-shaped cross-section have been found to be quite effective in retaining the food on the hanger when the animal picks at the food. Additionally, the use of the top and bottom plates in connection with the use of protuberances on an H-shaped shaft has been found to be particularly effective in retaining the food on the hanger. These and other objects and advantages of the present invention will become apparent from the detailed description, claims, and accompanying drawings.

DESCRIPTION OF THE DRAWING

FIG. 1 is a perspective view of a prior art seed conglomeration hanger;

FIG. 2 is a perspective view of another prior art seed conglomeration hanger;

FIG. 3 is perspective view of one embodiment of a seed, treat or food conglomeration hanger in accordance with the present invention with the formed food conglomeration shown in partial phantom;

FIG. 4 is a perspective view of an additional embodiment of a hanger in accordance with the present invention;

FIG. 5 is a perspective view of an enlarged portion of the hanger of FIG. 3, shown secured on the bars of a cage; and FIG. 5A is a cross-section of the shaft of the hanger shown in FIG. 5 taken generally along the line 5A—5A in FIG. 5.

DETAILED DESCRIPTION OF THE PREFERRED EMBODIMENTS

As shown in FIGS. 3 and 4, a formed seed, treat, or other food hanger (identified generally as 50) in accordance with the present invention includes a shaft 52 having top 54 and bottom 56 ends. It has been found that a substantially H-shaped cross section may be effectively used for the shaft 52 but other shapes may also be used. The shaft 52 may have a small post 55 extending substantially perpendicular therefrom at substantially the midpoint of the length of the shaft 52. The post 55 helps support the shaft 52 and prevents it from bending as the treat 70 is formed around the shaft 52. Multiple posts 55 may be included along the length of the shaft 52 if desired or necessary to support the shaft 52.

The shaft 52 has a number of protuberances 58 along the length thereof. The protuberances 58 may be in a variety of shapes and in varying numbers and locations along the shaft 52, but it has been found that when an H-shaped shaft 52 is used, semi-cylindrical or gibbous protuberances 58 along two opposite sides of the shaft 52 are particularly effective in achieving the objects of the invention.

A top plate 60 is disposed on the top end 54 of the shaft 52 in a plane substantially perpendicular to the shaft 52. The top plate 60 includes a hanging clip 62 extending from the top thereof. The hanging clip 62 may take a variety of shapes such as the doubled over shape shown in FIG. 3 or the single clip arm shape shown in FIG. 4. In either embodiment, the hanging clip preferably includes at least one humped portion 64 under which a bar 65 of a cage can be positioned so that the hanger 50 is supported by the cage (FIG. 5). A bottom plate 66 is disposed on the bottom end 56 of the shaft 52 in a plane substantially perpendicular to the shaft 52. The bottom plate 66 may include a securing clip 68 depending from the underside of the bottom plate 66. The securing clip 68 may be a single arm clip as shown in FIG. 4, a double arm clip as shown in FIG. 3, or another configuration as desired. In any case, the securing clip 68 may be clipped over a portion of the cage to better secure the hanger 50 within the cage.

Seed, treat, or other food 70 is formed and disposed about the shaft 52 along its length between the top plate 60 and the bottom plate 66. The pieces of food 70 are held together and to the shaft 52 and plates 60 and 66 by a sticky material such as honey or dextrose as is known in the art. As compared to the prior art hanger devices shown in FIGS. 1 and 2, the protuberances 58 along the length of the shaft 52 and the H-shape of the shaft 52 provide additional surface area to which the food 70 is secured and provide an impediment to the sliding of the food 70 off the hanger 50 when the animal picks at the food 70. The use of the top 60 and bottom 66 plates in connection with the protuberances 58 and H-shaped cross-section has been found to be the most effective hanger 50 structure to which food 70 can be mounted and around which food 70 conglomerations can be formed.

The hanger 50 may be formed from plastic or other suitable materials to which the sticky material and the food 70 can securely adhere. If plastic material is used, the hanger 50 may be formed in an injection molding process as is well known.

As illustrated by the foregoing description and shown in the Figures, the present invention is more suitable as a seed, treat, or food hanger than are conventional food hangers. The present invention overcomes the limitations and disadvantages of existing hangers by utilizing an effective design whereby the food is retained on the hanger when the animal picks at the food, the hanger is easily securable within a cage, and the hanger is cost effective.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. A formed treat support for use in a small animal cage, the support comprising:

a shaft having top and bottom ends and a substantially H-shaped cross-section;

a plurality of gibbous protuberances along the length of the shaft;

a top plate disposed on the top end of the shaft in a plane substantially perpendicular to the shaft, the top plate including a hanging clip capable of engaging the cage;

a bottom plate disposed on the bottom end of the shaft in a plane substantially perpendicular to the shaft, the bottom plate including a securing clip; and a plurality of pieces of food disposed about the shaft between the top and bottom plates, the food held together and to the shaft and plates by a sticky material.

2. The formed treat support of claim 1 further comprising a post extending substantially perpendicularly from the shaft, the post extending from the shaft at substantially a midpoint along the shaft.

3. A support structure to which small animal food can be affixed using a sticky material, the support structure comprising:

a shaft having a top end and a bottom end;

a top plate disposed on the top end of the shaft;

a bottom plate disposed on the bottom end of the shaft;

a plurality of protuberances along the length of the shaft;

at least one post extending from and being substantially perpendicular to the shaft;

wherein the top plate is disposed on the top end of the shaft in a plane substantially perpendicular to the shaft;

wherein the bottom plate is disposed on the bottom end of the shaft in a plane substantially perpendicular to the shaft;

wherein the protuberances along the length of the shaft are rounded; and wherein the top plate includes a hanging clip.

4. The support structure of claim 3 wherein the bottom plate includes a securing clip.

5. The support structure of claim 4 further comprising small animal food disposed about the shaft between the top and bottom plates, the small animal food held together and to the shaft and plates by a sticky material.

6. The formed treat support of claim 5 wherein the protuberances along the shaft are gibbous.

7. A support structure to which small animal food can be affixed using a sticky material, the support structure comprising:

a shaft having a top end and a bottom end;

a top plate disposed on the top end of the shaft;

a bottom plate disposed on the bottom end of the shaft;

a plurality of protuberances along the length of the shaft;

at least one post extending from and being substantially perpendicular to the shaft;

wherein the top plate is disposed on the top end of the shaft in a plane substantially perpendicular to the shaft;

wherein the bottom plate is disposed on the bottom end of the shaft in a plane substantially perpendicular to the shaft;

wherein the protuberances along the length of the shaft are gibbous; and wherein the top plate includes a hanging clip.

8. The support structure of claim 7 wherein the bottom plate includes a securing clip.

9. The support structure of claim 8 further comprising small animal food disposed about the shaft between the top and bottom plates, the small animal food held together and to the shaft and plates by a sticky material.

10. A formed treat support comprising:

a shaft having a plurality of protuberances along its length, the shaft having top and bottom ends;

a top plate disposed on the top end of the shaft, the top plate including a hanging clip;

a bottom plate disposed on the bottom end of the shaft; and a conglomeration of small animal food disposed about the shaft between the top and bottom plates, the food held together and to the shaft and plates by a sticky material.

11. The formed treat support of claim 10 wherein the top plate is disposed on the top end of the shaft in a plane substantially perpendicular to the shaft.

12. The formed treat support of claim 11 wherein the hanging clip includes at least one humped portion.

13. The formed treat support of claim 12 wherein the bottom plate is disposed on the bottom end of the shaft in a plane substantially perpendicular to the shaft.

14. The formed treat support of claim 13 wherein the protuberances along the length of the shaft are rounded.

* * * * *